United States Patent [19]

Nill

[11] Patent Number: 4,642,195
[45] Date of Patent: Feb. 10, 1987

[54] SCREENING SYSTEM INCLUDING A SCREEN CLEANING MEANS FOR AND A METHOD OF CLEANING A SCREEN IN A WASTE WATER PURIFICATION PLANT

[76] Inventor: Walter Nill, Rud. Diesel-Strasse 2, 8404 Winterthur, Switzerland

[21] Appl. No.: 874,400

[22] Filed: Jun. 16, 1986

Related U.S. Application Data

[63] Continuation of Ser. No. 624,773, Jun. 26, 1984, abandoned, which is a continuation of Ser. No. 392,014, Jun. 25, 1982, abandoned.

[30] Foreign Application Priority Data

Jul. 1, 1981 [CH] Switzerland .......................... 4346/81

[51] Int. Cl.<sup>4</sup> ............................................. B01D 23/02
[52] U.S. Cl. .................................... 210/798; 210/159; 210/162; 210/170; 210/411; 210/499
[58] Field of Search ................ 210/159, 154, 155, 163, 210/164, 165, 166, 311, 409, 411, 413, 427, 791, 797, 798, 169, 101, 170, 499; 222/564, 566, 535, 575, 166, 604, 605; 141/271, 286, 377; 239/377, 378

[56] References Cited

U.S. PATENT DOCUMENTS

| 610,849 | 9/1898 | McElroy | 210/101 |
|---|---|---|---|
| 1,045,342 | 11/1912 | Thomas | 222/560 |
| 3,093,580 | 6/1963 | Siewert | 210/159 |
| 3,837,494 | 9/1974 | Stevenson | 210/311 |
| 4,167,482 | 9/1979 | Muller | 210/791 |

FOREIGN PATENT DOCUMENTS

| 2910523 | 4/1980 | Fed. Rep. of Germany | 210/159 |
|---|---|---|---|
| 590980 | 8/1977 | Switzerland | 210/159 |

OTHER PUBLICATIONS

"Schweizerishe Bauzeitung," Feb. 26, 1981, pp. 175–180.
Simmers, "Buoyant Media Filter," Proceedings of 40th International Water Conference, Oct. 30–Nov. 1, 1979, pp. 25–27.

Primary Examiner—Ernest G. Therkorn
Attorney, Agent, or Firm—Werner W. Kleeman

[57] ABSTRACT

In order to clean a screen in a waste water purification plant a surge of a body of water is generated by the agency of a dump flushing apparatus, which surge drops in a free fall towards the screen to be cleaned. This surge of cleaning water is given a dimensional extent which ensures for a substantially simultaneous impinging of the body of water onto the total extent of the screen. A framing which surrounds the screen encompasses this surge of water such as to guide the water and to force the water to flow through the screen. During the cleaning or flushing action the contaminants adhering to the screen, which contaminants are substantially of a thixotropic nature, will be removed from the screen and flushed through a sump towards the water purification section of the water purification plant.

16 Claims, 4 Drawing Figures

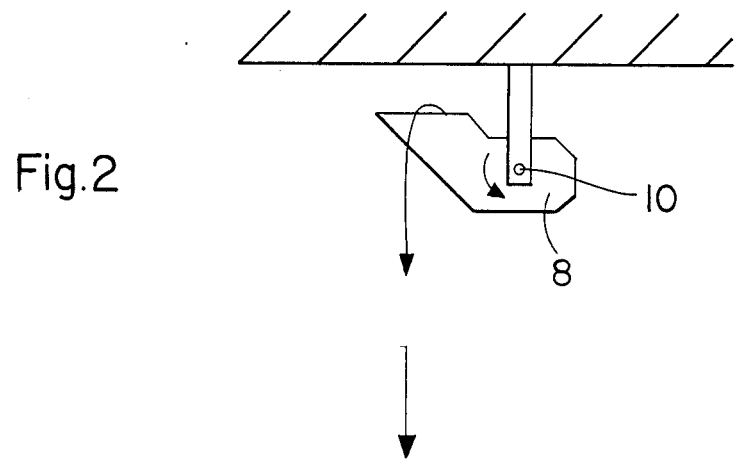
Fig.2
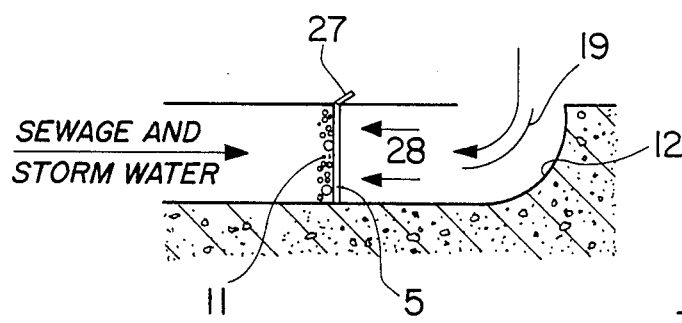
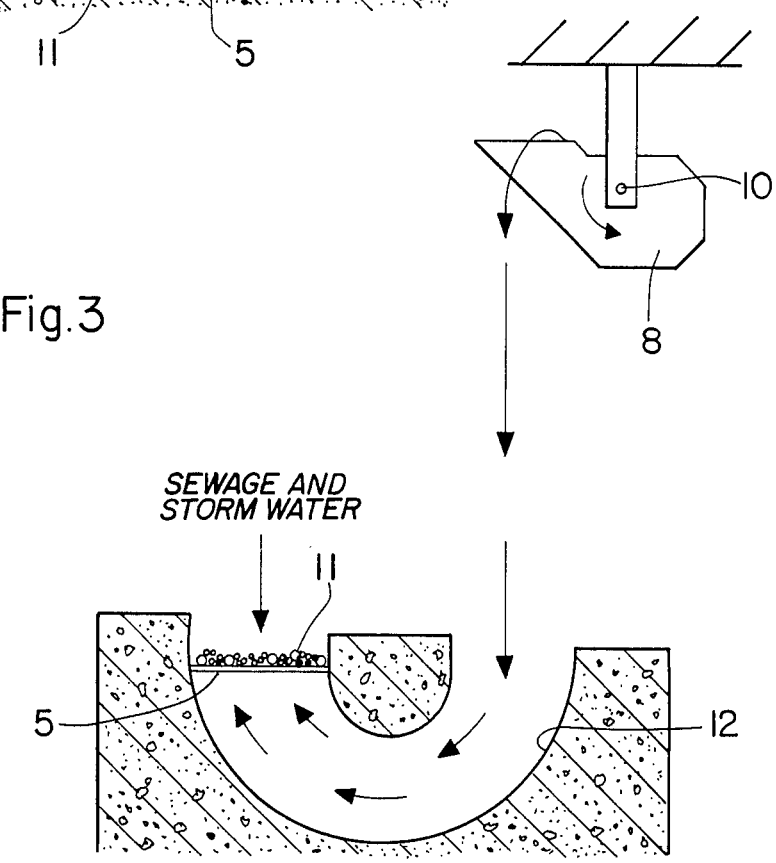
Fig.3

SCREENING SYSTEM INCLUDING A SCREEN CLEANING MEANS FOR AND A METHOD OF CLEANING A SCREEN IN A WASTE WATER PURIFICATION PLANT

CROSS REFERENCE TO RELATED APPLICATIONS

This application is a continuation of my U.S. patent application Ser. No. 06/624,773, filed June 26, 1984, entitled "A Screening System Including a Screen Cleaning Means for and a Method of Cleaning a Screen in a Waste Water Purification Plant" which, in turn is a continuation application of my U.S. patent application Ser. No. 06/392,014, filed June 25, 1982, both now abandoned.

BACKGROUND OF THE INVENTION

The present invention relates to a screening system for screening a flowing medium, which system is provided with a screen and a means for intermittent cleaning of the screen, which cleaning means is provided with a dump flushing apparatus comprising a tilting water storage container arranged at a higher elevation than the screen and intended to produce a surge of a flowing screen cleaning medium which impinges upon the substantially clean side of the screen and flows thereafter through the screen.

The invention relates also to a method of cleaning a screen in a waste water purification plant, which screen is intended to screen waste water which contains coarse solid particles, the screen being intermittently cleaned by directing a surge of a body of screen cleaning water against the side of the screen located downstream thereof relative to the direction of flow of the waste water.

Purification plants for waste water are basically designed and dimensioned to treat the sewage which flows to the plants in a more or less steady stream. During and after a rainfall, specifically a heavy rainfall, the amount of water flowing to such plants increases such that the combined flow of sewage water including storm water exceeds the handling capacity of the various water treating sections of such plant. In order to cope with this problem, waste water purification plants are provided with an overflow. The excess volume of water which cannot be handled by the water purification plant or sewage treatment plant flows over such overflow and is led directly into rivers, streams, lakes, and so forth. Such overflows are generally provided with a screen which may be a mesh-like structure or a grate-like structure having a number of parallel extending rods in order to prevent coarse solid particles from reaching e.g. the river. The contaminants of mainly the sewage water will obviously also settle on such screens in addition to the coarse particles which are screened out such that a periodical cleaning of the screens is necessary in order to prevent a clogging thereof.

Generally, such cleaning of the screens has been customarily carried out by scratching the deposits off or by performing a cleaning operation utilizing pressurized water led thereto by a hose. These cleaning procedures necessitate, however, often a dismounting of the clogged or partially clogged screen. Such is obviously tedious and time-consuming work, whereby the cleaning effect has often proven to be insufficient. Specifically when cleaning the screens by pressurized water, thixotropic deposits, e.g. sludge and sewage, which are of a jelly-like consistency keep clinging to the screen and merely move from the section thereof momentarily being cleaned to another section of such screen or such deposits may yield by flowing away along the screen and then again return to the original position. Often those deposits will change under the influence of the spray of pressurized water into a flowable state such that they will easily move along the screen and after returning to the original state they again will solidify. Furthermore, all matter which has been finally removed from the screen which has been dismounted must be disposed of in a separate working step.

SUMMARY OF THE INVENTION

Hence, it is a general object of the present invention to provide a screening system for screening a flowing medium and having means for intermittent cleaning of the screen which allows a fast and effective cleaning of such screens without the necessity of a dismounting thereof.

A further object aims at the provision of a method of cleaning a screen in a waste water purification plant which leads to a thorough and effective cleaning of the screen without the necessity of a removal of such screen.

A further object is to provide a screening system for screening a flowing medium having a screen and means for intermittent cleaning of such screen in which the extent of the projection of the cross-sectional area of a surge of a screen cleaning medium onto a plane defined by the screen corresponds substantially to the extent of the screening area of the screen.

Yet a further object is to provide a method of cleaning a screen in a waste water purification plant which comprises a step of guiding a body of water forming a surge by a framing structure extending around the screen such that the projection of the cross-sectional area of the body of water onto a plane defined by the screen substantially equals the cross-section of the screening area of the screen.

The contaminants and deposits which accordingly have been removed from the screen may be flushed away by the cleaning medium, for instance water, and tests have disclosed, that the cleaning may be carried out within an extremely short time span, for instance within about 20 seconds.

A preferred embodiment of the invention arranged in waste water purification plants comprises a dump flushing apparatus, such as a tilting water storage container, which initially is filled with cleaning water. The water surge which increases its kinetic energy during its fall impinges roughly perpendicularly onto the screening plane, whereby, depending on the prevailing arrangement, deflection baffles may be installed for properly guiding the body of water defining the surge. This surge of water acts substantially simultaneously upon the entire screen surface and, accordingly, it is not possible for the thixotropic deposits to move out of the way, i.e. to yield at the screen structure. Because of the simultaneous impinging action these deposits will be carried along by the water of the surge in their entirety, they will be dissolved regarding their inner cohesion and thereafter flushed off. Due to the framing extending around the screen structure or sieve a useless flowing off of the cleaning water will be prevented and a large density of energy, i.e. pressure head above the screen can be generated thus increasing the cleaning of the screen structure. A specifically advantageous design is a framing structure which is completely closed circumferentially and is pressure resistant.

The height of fall of the free fall of this body of water is chosen preferably such that, on the one hand, this water surge will not separate into individual drops which may be the case if the fall or drop height is chosen to be too great and, on the other hand, such that the surge contains a sufficiently large kinetic energy. Practical tests of embodiments have proven that the invention possesses an excellent cleaning effect specifically on screens having small mesh sizes such that when choosing the mesh width of a screen for such a plant, it is merely necessary to consider its screening action regarding the sewage water and it will not be necessary to design the screen in consideration of the cleaning thereof. It has been proven that about 700 kg of a cleaning medium are necessary for cleaning 1 m² screen surface area, i.e. a working content of about 1500–3000 mkg is necessary.

In order to generate a surge of water having a sufficient volume and within a short time span, dump flushing apparatuses are utilized. Such apparatuses have been installed to clean the bottom of storm water basins and of water purification plant basins and have been disclosed, for instance in Swiss Patent No. 590,980, granted June 15, 1977 and in the German Patent Publication No. 2,910,523, published Sept. 4, 1980.

Special reference is made to the aforementioned Swiss Patent No. 590,980 which discloses a dump flushing apparatus.

The periodical "Schweizerische Bauzeitung" No. 9/81 of Feb. 26, 1981, pages 178–180, FIGS. 14, 15 and 16, disclose a screen cleaning system having a dump flushing apparatus. The figures and the text of this publication give, however, no teaching regarding the cross-sectional dimensions of the surge projected onto the plane defined by the screen and the area of the screen, which relationship is decisive regarding the cleaning effect because as mentioned earlier, it is mandatory that the surge of water acts practically or substantially simultaneously upon substantially the complete screen surface in order to attain the desired cleaning effect. This simultaneous impingement onto substantially the entire screen surface does not allow a sideways yielding of the deposits or a moving of the deposits along the screen to another location not subject to the impingement of water where they remain clinging to the screen. Furthermore, the arrangement in accordance with the mentioned publication does not show a framing structure, which structure prevents a deviation of the surge from its proper direction of movement.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIGS. 2, 3 and 4 show further preferred embodiments of screen cleaning structures.

DETAILED DESCRIPTION OF THE PREFERRED EMBODIMENTS

Figure 1:
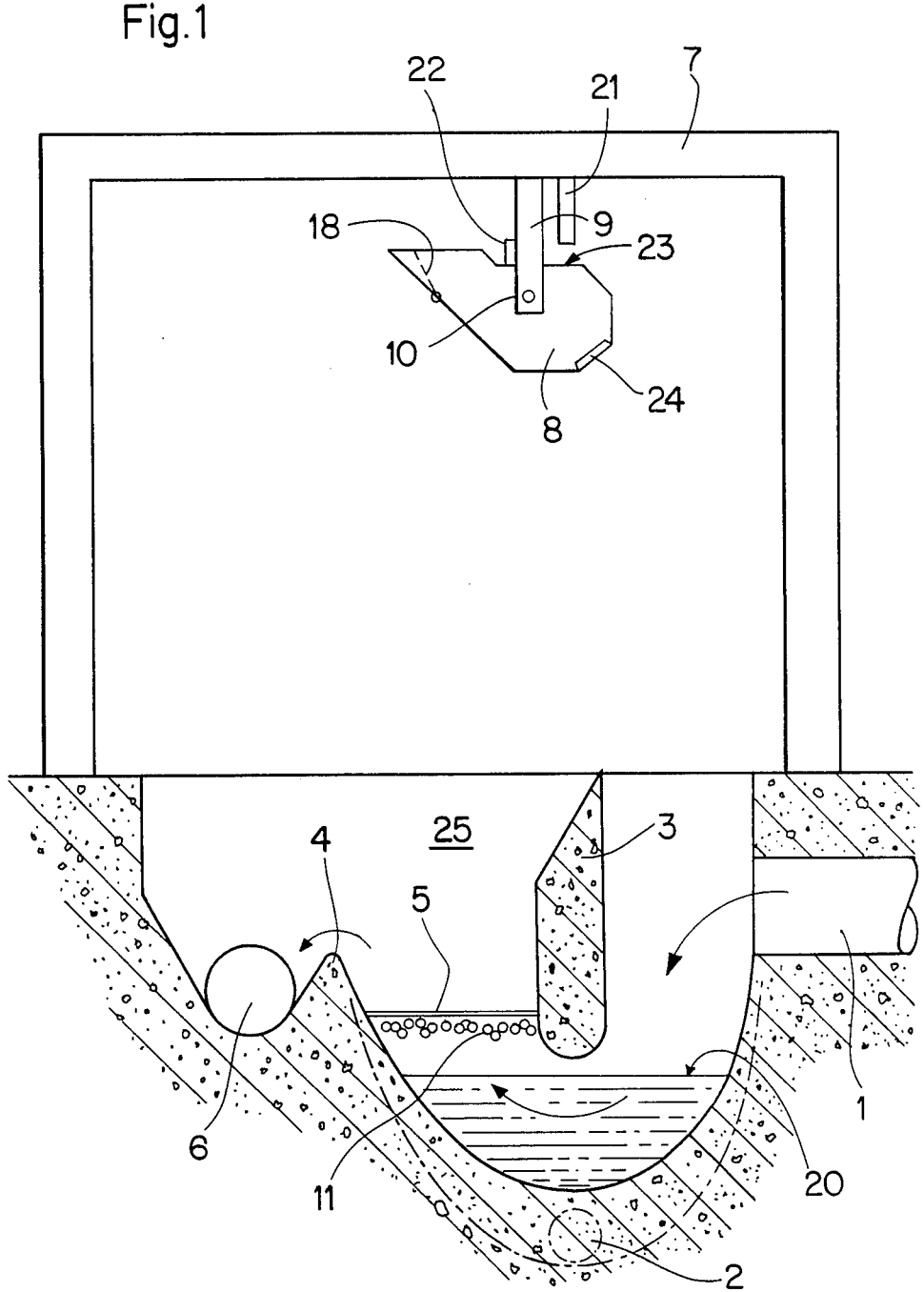
FIG. 1 is a schematical sectional view of a screening system for screening sewage water including storm water.

Describing now the drawings and considering initially the first preferred embodiment shown in FIG. 1, it will be understood that the same comprises an inlet 1 through which the sewage water including, depending on the precipitation, storm water flows in. A sump 2 is provided, which sump 2 is in communication with the water purification plant proper. Under normal conditions, that is under normal sewage flow conditions without any excessive storm water, all inflowing water flows through the shown sump 2 to the purification plant to be treated according to any well known method. There is, furthermore, arranged a baffle 3 and a spillway 4. Between these concrete structures forming the baffle 3 and the spillway 4 a screen 5 is arranged. The water flows through a channel-like structure against and through the screen 5. This channel is defined by the baffle 3, the spillway 4 and the two side wall portions of the building shown, of which side walls the wall 25 is identified. These elements, namely baffle 3, spillway 4 and side walls 25, define together a framing structure or frame means of the screen 5, the object of which is explained later on.

If now during or after a rain storm, after precipitation, storm water increases the normal volume of the inflowing sewage entering the system through the water inlet 1, the water level under the screen 5 will rise such that water will flow through this screen 5, will flow further over the spillway 4 and finally into a discharge channel 6 leading to the main ditch which, in turn, is in communication with, for instance, a river, a lake or the ocean, etc. A ceiling of the housing structure or plant part, respectively, is identified by the reference numeral 7. A dump flushing apparatus 8 is provided which comprises a tilting water storage container which is suspended by the agency of suspension members 9 on this ceiling 7. The operation of a dump flushing apparatus is generally known such that only its main features will be mentioned hereinafter.

This dump flushing member 8 is basically an elongated container having the cross section as shown in FIG. 1, which is rotatably suspended at an axis or hinge point 10 suspended in turn in the suspension members 9. This dump flushing member 8 can be filled with water flowing out of a supply or feed tube 21 arranged thereabove and suspended, for instance, on the ceiling 7. The hinge point 10 of the dump flushing member or container 8 is located relative to its center of gravity such that the member 8 is inclined to rotate clockwise. That is, this center of gravity of the (empty) metal container 8 is somewhat to the right of the pivot axis or hinge point 10. The empty member 8 will, thus, keep the position shown in FIG. 1. A further clockwise rotation of this member 8, in relation to the axis 10, due to the laterally offset center of gravity is prevented by means of a stop 22 arranged at the suspension members 9, against which stop an edge portion of member 8 abuts in the position shown. In order to secure a definite position of the member 8 in its empty state an additional weight mass 24 may be added at the location shown in FIG. 1. The shape of this dump flushing member or container 8 is now such that as soon as water is filled into this rotatable container 8 through tube 21 the water volume in the container 8 will be such that the center of gravity of the volume will lie at the left-hand side of the pivot axis 10 and such, that the summarized point of gravity, i.e.

the point of gravity of the water volume including the point of gravity of the container 8 will physically shift to the left, i.e. will move to the left-hand side of the pivot axis 10. This will now lead to a rotation of the member or container 8 in a counter-clockwise direction such that the water will pour out of the member 8. This member 8 will, in this embodiment, rotate by 90° into a vertical position, in which its rim section 23 will abut stop 22. As soon as the body of water previously contained in this container 8 is no longer present, the center of gravity will obviously be again at the right-hand side of the pivot axis 10 such that the container 8 will immediately rotate and turn back into the rest position shown in FIG. 1, in which position it thereafter may again be filled with water flowing out of the feed tube 21.

This dump flushing member 8 is located such that the surge of water which will be formed when the member empties itself impinges in a free fall directly onto the screen 5. Because of the presence of the previously mentioned framing structure, i.e. baffle 3, spillway 4 and side walls 25, the body of water of this surge of water is guided positively onto screen 5. Thereby the height of this framing, and in FIG. 1 specifically the height of spillway 4, is chosen such that this framing defines a space which is large enough to contain the entire volume of the water surge such as to positively guide the water against and through the screen 5 so as to avoid a loss of water and also of energy and thus to increase the cleaning of the screen 5.

If now a mixture of sewage water and storm water flows in via the water inlet 1 in an excessive volume, the excessive amount of water will flow over the spillway 4 and via the discharge channel 6 directly into the main discharge channel of the water purification plant such as indicated by the arrows in FIG. 1. This water which flows over spillway 4 into the discharge channel 6 is now screened by the screen 5 to remove at least coarse particles or contaminants. Accordingly, deposits 11 will form at the bottom side of screen 5 after a certain duration and adhere mainly at the upstream side of screen 5 such that the throughflow resistance thereof will be substantially increased or such deposits may eventually clog the screen 5 completely. Accordingly, this screen must be cleaned periodically.

To this end the container, i.e. the dump flushing member 8, will be filled with screen cleaning water flowing out of the supply or feed tube 21. As soon as member 8 is filled, it will rotate around its pivot axis 10 as mentioned above, whereby this rotational movement is an abrupt movement such that a solid body of water forming the surge of water will be generated. The dump flushing member 8 is dimensioned and shaped such that a surge is shaped which acts upon the complete surface of the screen 5. The framing of this screen 5 prevents an escape of the cleaning water surge and forces the entire body of water forming the surge to flow through screen 5 and thus to enhance its cleaning. Thereby the deposits 11 will be removed from the screen 5 and carried along by the flushing water and flow via sump 2 into the purification plant. Quite obviously the water level 20 must be below screen 5 to allow the surge of water to flow through this screen 5. It is, however, not necessary to completely shut-off the water inlet 1 because as long as the inflow of the water does not exceed the discharge capacity of the sump 2, the water level 20 will not rise further. Under such conditions sewage water and possible storm water will flow to the purification plant in a continuous manner.

Because the surge of water impinges or strikes onto the complete surface of the screen, a lateral yielding of the usually thixotropic deposits can be avoided. It is known that thixotropic deposits are of a jelly-like consistency such that they remain clinging to, for instance, the screen 5, but will move sideways thereupon. The surface 20 of the water below the screen 5 must have a distance from the screen 5 which is large enough that the removed deposits can freely flow out together with the cleaning water. This distance is necessary such that it is not possible that the removed particles can bounce back from the water surface 20 or bounce back from an opposite wall section in case that the water level 20 is extremely low. Practical tests have shown namely, that if the mentioned distance is chosen too small, the contaminants bouncing back from the water level 20 or an opposite wall section may be forced through the screen 5 and to the opposite side thereof such that they come to rest on the upper side of the screen 5 and thus cannot be removed or even caused to reach the discharge channel 6. In order to control and specifically concentrate the surge of water the dump flushing member 8 may be provided with an adjustable guide baffle 18. A preferred height of the dump flushing member 8 relative to the screen 5, i.e. the distance therebetween, has been proven by further tests to be in a range of about 3 to 5 m; the distance of the free space below the screen 5 such as described above, i.e. the distance between the lower side of the screen 5 and the water level 20 or an opposite wall, must amount to about 1/10 of the distance between screen 5 and dump flushing member 8.

In order to attain the described cleaning action the screen 5 should extend preferably horizontally such that the surge of water will impinge perpendicularly onto screen 5. Screens which are arranged slanted or even in a vertical position necessitate the provision of a guide baffle 19 (see FIG. 2) which is located below the dump flushing member 8, which deflection baffle 19 deflects and guides the surge of water with a minimum amount of losses such that the body of water of the surge impinges against and always perpendicularly onto screen 5.

As shown in FIGS. 2 and 3, a deflection channel 12 arranged at the lower end of the height of fall of the water surge can deflect this water surge. Accordingly, it is possible to embody the invention also at vertically (FIG. 2) oriented screens 5 or at such screens 5 shown in FIG. 3, through which the sewage water to be screened flows downwards to the screen, i.e. in a direction opposite to the direction shown in FIG. 1. In all embodiments the surge of water will impinge on the downstream side of the screen 5 relative to the direction of flow of the sewage water being cleaned. These various arrangements or orientations of the screens 5 may be governed by particular reasons of the plant or site in question.

The framing around the screen 5 of the embodiment of FIG. 2 is composed of the bottom of the deflection channel 12, of two side walls 28, of which only one is shown, and of a slanted guide plate 27 arranged at the upper rim of screen 5. Accordingly, it is not necessary to build a completely enclosed channel in order to embody the invention. It can operate as well in conjunction with an open channel.

According to FIG. 3, in which the angle of deflection is 180°, the sewage and storm water flows downwards and the surge of cleaning water flows upwards. The height of fall remains, however, the same as is the case in the embodiment of FIG. 1.

Figure 4:
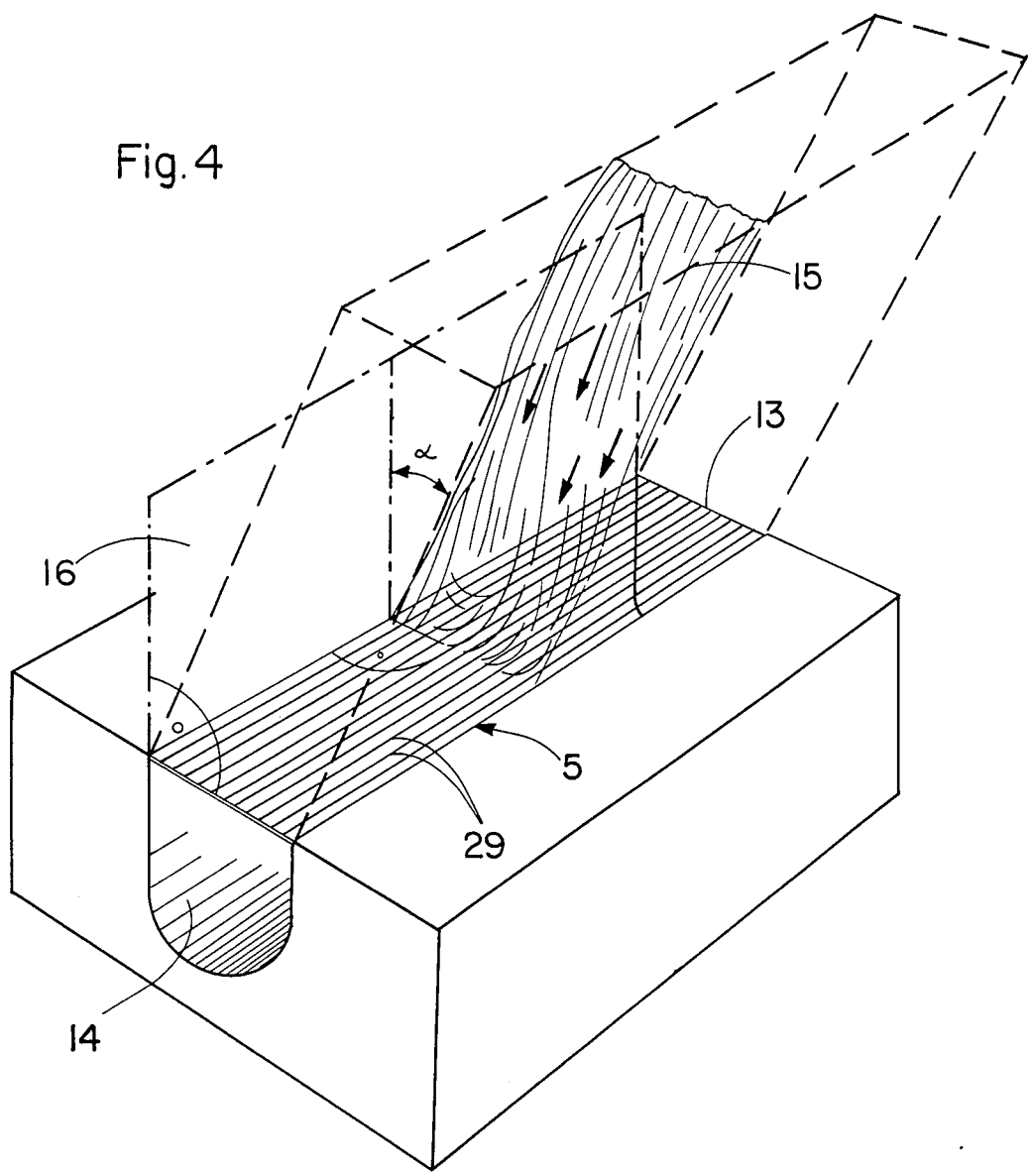

The screens 5 referred to above may comprise screens having a screening mesh, a net-like structure as is well known. Other screens are built up from a plurality of parallel extending rods. Such screens may equally be cleaned by the arrangement as described above; however, in FIG. 4 a specifically preferred embodiment is shown regarding the cleaning of a grating 13 overlying a channel 14 for sewage and storm water, which cleaning is effected by a water surge 15. The arrangement is such that this surge 15, i.e. the body of water forming this water surge, is limited laterally by two imaginary planes 16 extending parallel to the individual rods 29 of the grating, which surge 15 impinges, in addition, at an inclusion of an acute angle α with the plane defined by the rods 29 onto the grating 13. The imaginary planes 16 may obviously be formed by stone walls or metal sheet plate and so forth. For sake of good order it must be mentioned that only one plane 16 is shown in FIG. 4.

In this embodiment one component of the water power acts perpendicularly and the other in longitudinal direction onto the screen 5, which arrangement has proven to achieve an improved dislocation and removal of string- or thread-shaped deposits on a grating. Tests carried out with this embodiment in a city water purification plant, i.e. a city sewage treatment plant, show that an optimal cleaning and contaminant removal is reached at an angle α of 60°.

The cleaning water used in the embodiment of the invention features at the beginning of the cleaning proper relative to the surface of the screen a potential energy which is transformed due to the downwards movement into kinetic energy. With striking or impinging upon the screen this kinetic energy will be transformed partly into a statical pressure energy or pressure head, and when carrying out work which is necessary to remove the contaminants from the screen 5, the aforementioned energy or pressure head is transformed back into an energy of movement i.e. kinetic energy, and accordingly, the contaminants will be effectively removed.

Finally, it is pointed out that in order to demonstrate the increased cleaning action which is exerted upon the screen 5 when there is employed a framing means or frame as described hereinbefore comparative tests have been conducted. Specifically, experiments were performed for the purpose of testing and evaluating the effectiveness of cleaning a clogged screen under identical conditions, except, in one case the clogged screen was surrounded by framing means, as described hereinbefore, whereas in the other case no such framing means were used. When using the framing means it was found that approximately 86.1% of the water used to clean the dirty screen passed through the screen when surrounded by such framing means. This compared quite favorably against a 54.1% flow of water through the dirty screen when no such framing means was used. It is therefore apparent that with the provision of the framing means a more efficient use of the cleaning water is effectuated and there results an enhanced and materially increased cleaning action of the dirty screen. In fact, when using the framing means the clogged screen is substantially clear and freed of dirt which was initially present in contrast to the only partially cleaned screen which still contained a considerable amount of dirt when cleaned without the aid of the inventive framing means. This has been more fully document in my Declaration Under 37 C.F.R: §1.132, December 31, 1985 and made of record during prosecution of my aforementioned U.S. patent application Ser. No. 06/624,773, filed June 26, 1984, to which reference may be readily had and the contents of which are incorporated herein by reference.

While there are shown and described present preferred embodiments of the invention, it is to be distinctly understood that the invention is not limited thereto, but may be otherwise variously embodied and practiced within the scope of the following claims.

Accordingly, what I claim is:

1. An apparatus for screening solid debris from the waste water of a waste water purification plant, comprising:
    (a) means defining a waste water flow path including a waste water inlet and a filtered water discharge outlet;
    (b) screen means having an outlet side and arranged in said flow path between said waste water inlet and said filtered water discharge outlet for screening solid debris from the waste water flow;
    (c) framing means extending around said screen means and located substantially at said outlet side of said screen means relative to the flow of the waste water in order to positively guide a surge of high impact velocity cleaning fluid against and through said screen means when said screen means has at least said outlet side thereof freely exposed and to build-up a static pressure head of said high impact velocity cleaning fluid directed against the screen means for cleaning said screen means of the solid debris;
    (d) back-flush means for directing the high impact velocity cleaning fluid in a free fall against the outlet side of said screen means to periodically remove debris therefrom, including:
    container means supported at an elevation at a given distance above said screen means for receiving a given volume of said cleaning fluid, said container means being operable between fluid storing and fluid discharging positions.

2. The apparatus as defined in claim 1, further including:
    means for normally retaining said container means in said fluid storing position; and
    said retaining means comprising a weight mass connected with said container means for counterbalancing said container means and a stop for arresting movement of said container means beyond said fluid storing-position.

3. The apparatus as defined in claim 2, wherein:
    said container means includes baffle means at an outflow portion thereof for controlling the duration of release of said volume of cleaning fluid and for controlling the cross-sectional configuration of said volume of cleaning fluid as it is released from said container means.

4. The apparatus as defined in claim 1, wherein:
    said flow path includes a substantially vertically oriented portion; and
    said screen means being substantially horizontally arranged in said vertically oriented portion directly beneath said container means.

5. The apparatus as defined in claim 4, wherein:
    said distance between said container means and said screen means is between 3 and 5 meters.

6. The apparatus as defined in claim 5, wherein:
the surface of the waste water is arranged below said screen means at a distance of approximately 1/10 of said distance between said container means and said screen means.

7. The apparatus as defined in claim 1, wherein:
said screen means comprises a plurality of spaced parallel rods defining a grate; and
said cleaning fluid is laterally defined by a pair of spaced imaginary vertical planes, said cleaning fluid striking said grate at an angle between 0° and 90° relative to said grate.

8. The apparatus as defined in claim 1, wherein:
said container means receives as said cleaning fluid water.

9. An apparatus for screening solid debris from the waste water of a waste water purification plant, comprising:
(a) means defining a waste water flow path including a waste water inlet and a filtered water discharge outlet;
(b) screen means having an outlet side and arranged in said flow path between said waste water inlet and said filtered water discharge outlet for screening solid debris from the waste water flow; and
(c) back-flush means for directing high impact velocity cleaning fluid against said outlet side of said screen means to periodically remove debris therefrom, including:
   (1) container means pivotally supported at an elevation at a given distance above said screen means for receiving a given volume of said cleaning fluid, said container means being pivotally operable between fluid storing and fluid discharging positions.
   (2) means normally retaining said container means in said fluid storing position;
(d) said flow path includes a substantially horizontally oriented portion;
(e) said screen means being substantially vertically arranged in said horizontal path portion; and
(f) deflection means arranged in said flow path on an outlet side of said screen means and directly below said container means for deflecting said cleaning fluid against said screen means with minimal cleaning fluid loss.

10. A method of cleaning a screen in a waste water treatment plant, the screen being adapted to remove solid debris from a flow of waste water between a waste water inlet and a filtered water discharge outlet, comprising the steps of:
(a) storing a volume of cleaning water at an elevated level relative to the screen;
(b) intermittently releasing said volume of cleaning water so as to move in a free fall and to strike an outlet side of the screen with a high impact velocity owing to the force of gravity and which screen is freely exposed at least at its outlet side;
(c) temporarily confining the released volume of cleaning water by framing means extending around the screen at the outlet side of the screen in order to positively guide said released volume of cleaning water against and through the screen and to build-up a static pressure head at the temporarily confined released volume of cleaning water above the screen and to prevent lateral flowing-off of the cleaning water; and
(d) permitting said temporarily confined volume of water located above the screen to flow against an outlet surface area of the screen, the cross-sectional configuration of said confined volume of cleaning water which flows against said outlet surface area of the screen essentially corresponding to the outlet surface area of the screen.

11. The method as defined in claim 10, wherein:
said volume of cleaning water is directed to strike said outlet surface area of the screen essentially perpendicularly.

12. The method as defined in claim 10, wherein:
said volume of cleaning fluid is directed to strike said outlet surface area of the screen at an angle of between 0° and 90°.

13. The method as defined in claim 10, further comprising the step of:
adjusting a baffle at the region where there is stored said cleaning fluid to control the cross-sectional configuration and the duration of release of said volume of cleaning water.

14. A method of cleaning a screen in a waste water treatment plant, the screen being adapted to remove solid debris from a flow of waste water between a waste water inlet and a water outlet, comprising the steps of:
(a) furnishing a volume of cleaning water at an elevated level relative to the screen;
(b) arresting the flow of waste water to lower its level and expose the screen;
(c) intermittently releasing said volume of cleaning water to strike an outlet side of the exposed screen with a high impact velocity owing to the force of gravity;
(d) temporarily confining the released volume of cleaning water by framing means extending around the exposed screen at the outlet side of the exposed screen in order to positively guide said released volume of cleaning water against and through the exposed screen and to build-up a static pressure head at the temporarily confined released volume of cleaning water above the screen and to prevent lateral flowing-off of the cleaning water; and
(e) flowing said volume of cleaning water which is temporarily confined within the framing means through the screen.

15. The method as defined in claim 14, further including the steps of:
controlling the cleaning water flowing through the screen by means of the framing means such that the cross-sectional area of such cleaning water essentially corresponds to an effective surface area of the screen.

16. The method as defined in claim 14, further including the steps of:
releasing such a volume of said cleaning water which is sufficient to simultaneously strike the entire surface area of the outlet side of the screen in order to provide a substantially complete cleaning thereof and to prevent thixotropic jelly-like contaminants clinging to the screen from moving laterally along the screen structure away from an area subjected to a flow of cleaning water into an area not subjected to a flow of cleaning water and to return to their original position.

* * * * *